US006962432B2

(12) United States Patent
Hofeldt

(10) Patent No.: US 6,962,432 B2
(45) Date of Patent: Nov. 8, 2005

(54) MACHINE FOR MIXING AND DISPENSING SALAD DRESSINGS

(75) Inventor: Albert John Hofeldt, Miami Beach, FL (US)

(73) Assignees: HP Intellectual Corp., Wilmington, DE (US); Albert Hofeldt, Miami Beach, FL (US)

( * ) Notice: Subject to any disclaimer, the term of this patent is extended or adjusted under 35 U.S.C. 154(b) by 172 days.

(21) Appl. No.: 10/361,285

(22) Filed: Feb. 10, 2003

(65) Prior Publication Data

US 2004/0155063 A1 Aug. 12, 2004

(51) Int. Cl.[7] .............................................. A47J 43/046
(52) U.S. Cl. ....................... 366/118; 366/128; 366/130; 366/142; 366/192; 366/205; 366/206; 366/314; 366/601; 222/63; 222/158; 222/482; 215/309; 215/311
(58) Field of Search ................................. 366/123, 128, 366/130, 139, 142, 143, 182.4, 191–194, 199, 205, 206, 314, 325.1, 326.1, 601, 118; 222/63, 158, 478, 479, 482, 484, 506, 545, 546; 220/366.1, 254.4, 254.9; 215/309, 311–315

(56) References Cited

U.S. PATENT DOCUMENTS

| | | | | |
|---|---|---|---|---|
| 219,349 A | * | 9/1879 | Dierking | 222/158 |
| 730,530 A | * | 6/1903 | Goold | 222/484 |
| 1,219,491 A | * | 3/1917 | Santicola | 366/331 |
| 1,411,990 A | * | 5/1922 | Corson | 215/380 |
| 1,525,032 A | * | 2/1925 | Grady | 222/484 |
| 1,713,321 A | * | 5/1929 | Becker | 215/298 |
| 1,898,365 A | * | 2/1933 | Harding | 366/200 |
| 1,953,931 A | * | 4/1934 | Fastborg | 222/482 |
| 3,739,938 A | * | 6/1973 | Paz | 220/715 |
| 4,319,614 A | | 3/1982 | Boice | |
| 4,509,655 A | * | 4/1985 | Killmann | 215/309 |
| 5,639,161 A | * | 6/1997 | Sirianni | 366/314 |
| 5,662,249 A | | 9/1997 | Grosse | |
| 5,692,830 A | * | 12/1997 | Costanzo | 366/314 |
| 5,720,552 A | * | 2/1998 | Schindlegger | 366/197 |
| D391,806 S | | 3/1998 | Khubani | |
| 5,855,431 A | * | 1/1999 | Costanzo | 366/199 |
| 6,504,481 B2 | * | 1/2003 | Teller | 340/572.1 |

FOREIGN PATENT DOCUMENTS

CA        2096190     * 11/1994

* cited by examiner

*Primary Examiner*—David Sorkin
(74) *Attorney, Agent, or Firm*—Robert M. Schwartz; Werner H. Stemer

(57) ABSTRACT

My invention is a mixer and dispenser having a dispensing top with an outflow channel, an air vent, and an air vent valve that adjusts the vacuum inside the dispenser; a rotor attached to a battery powered motor; and two switches, one for operating automatically upon pouring and the other manually activated. The vacuum system controls the flow rate during pouring and the constant mixing disperses the ingredients so that the samples dispensed are representative of the original mixture.

32 Claims, 5 Drawing Sheets

MACHINE FOR MIXING AND DISPENSING SALAD DRESSINGS

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

FIELD OF THE INVENTION

This invention relates generally to the field of mixing and dispensing mixtures and more specifically to a machine for mixing and dispensing salad dressings.

BACKGROUND OF THE INVENTION

The combination of oil and vinegar, two immiscible liquids, is the basis of many salad dressings. Liquid and solid spices are combined with oil and vinegar to make an endless variety of salad dressings. When immiscible liquids and insoluble solids are combined, constant mixing is needed to keep the liquids from separating into layers and solids from settling to the bottom. An important physical property that affects mixing and pouring of salad dressings is the viscosity of the oil and this varies considerably among oils, particularly when cooled as often is desirable for preservation of the salad dressing.

Mixing the ingredients of salad dressings has usually been by shaking or stirring. The simplest technique is the manual stirring of a salad dressing in a bowl with a utensil and pouring the contents from the bowl onto the salad without any mechanism for controlling the flow rate. The advanced techniques use an electrically powered motor for mixing and like the simplest technique have no mechanism to control the rate of outflow.

There are two general methods of adding salad dressing to a salad. The first method is to add the entire amount of prepared dressing to the salad, a method that insures that the proportions of the ingredients are as intended, but has the disadvantage of needing to prepare a dressing for each salad or using the entire bottle of commercial dressing. This method is practical for large salads that are entirely consumed at one meal, but is impractical for small or individual salads.

The second method is to pour a sample of the prepared dressing onto a salad. This method is ideal for small to medium sized salads where pouring the entire bottle of dressing would be excessive and not economical. Pouring multiple samples of the dressing has the convenience of using a prepared dressing over an extended period of time.

Many examples of bottled dressings exist on shelves in grocery stores, some with a wide-open spout and others with a smaller outflow channel. The cap that closes the container can be a flip-top, a screw top, or a snap-on design. The dispensers with a smaller outflow channel have a perforation in a plate beneath the cap. A patented example of a wide-open dispensing container is the invention of Grosse, U.S. Pat. No. 5,662,249, September 1997, ALL IN ONE MEASURE/FUNNEL/POUR/MIX/SHAKE CONTAINER.

A variation of this type is the invention of Boice, U.S. Pat. No. 4,319,614, March 1982, SALAD DRESSING BOTTLE AND TOP STOPPER WITH INDIVIDUAL SERVER. Boice's invention consists of a shaker bottle with a removable individual serving dispensing cup inside the bottle. By tilting the bottle and shaking the contents, a proper distribution of salad dressing ingredients enter the individual serving cup. The cup is then removed and the contents poured over the individual salad. The process is repeated for each individual salad.

A motorized version of the wide-open dispenser is the Bonjour Salad Chef. It consists of a motorized emulsification disc that is inserted into the open top of the carafe. After mixing, the mixer is removed prior to pouring. The mixer must be re-inserted into the carafe each time mixing is needed. There is no mechanism to regulate the flow rate during dispensing. Another motorized mixer with a wide-open top is the Personal Power Mixer (Ontel Corp., Fairfield, N.J.). The Personal Power Mixer is designed to mix a variety of mixtures including salad dressing. This mixer also has no mechanism to regulate the flow rate during dispensing. The whisk at the bottom of the mixing chamber is patented: Khubani, U.S. Pat. No. D391,806, March 1998, WHISK FOR A MIXER.

One deficiency of prior technologies is the difficulty maintaining a uniform dispersion of the mixture in the mixing chamber during pouring. This is due to the time-dependent separation of the components. In the time it takes to remove the cap or to remove the power mixer, as in the case of the Bonjour Salad Chef, the mixture begins to separate into layers and the solid matter begins to settle to the bottom. The option is to pour quickly before the mixture separates into components or to pour slowly and accept a poorly mixed sample. When pouring quickly there is the risk of pouring an excessive amount of dressing. When pouring slowly, the mixture is not uniformly dispersed and the first samples contain an excessive amount of oil and the residual mixture in the dispenser has a greater proportion of vinegar than initially. As more samples are poured, the residual mixture becomes more disproportionate. No one sample is representative of the initial desired mixture and this is a serious deficiency of prior technologies.

Another deficiency of prior technologies is the poor control of the flow rate during pouring. Control of outflow has been limited to (1) varying the angle of pouring and (2) decreasing the diameter of the outflow channel. Controlling the flow by the angle of tilt is a dynamic process for the angle of tilt for any given flow rate changes as the dispenser empties. Presetting the angle has not been possible and the process is one of trial and error. Reducing the diameter of the outflow channel does reduce the flow rate but does not solve the problem of uncontrolled outflow. The dispensers with a small outflow channel require squeezing or shaking or a combination of squeezing and shaking for dispensing and the quantity ejected with each maneuver is variable and unpredictable, another trial and error process The dispensers having a reduced outflow diameter have the unique disadvantage of accommodating a limited variety of salad dressings. This is because the diameter of the outflow channel is designed for a specific salad dressing, depending upon the viscosity of the dressing and the size of the solid particles.

The deficiencies of U.S. Pat. No. 4,319,614 by Boice are (1) the fixed volume of the serving cup which restricts the samples to one size, a volume that may be too large or too small for the salad, (2) the entire volume of the serving cup must be dispensed because there is no method provided to mix the contents of the serving cup after it is removed from the bottle, (3) the multiple steps consisting of shaking, tilting to fill the serving cup, uncapping, removing the serving cup, pouring, replacing the serving cup, and recapping must be repeated for each sample, (4) the messiness of salad dressing dripping from the serving cup as it is removed from the bottle and transported to the salad, and (5) the possible contamination of the serving cup each time it is removed from the bottle and replaced.

The deficiencies of The Personal Power Mixer, the prior art illustrated in FIG. 1, are (1) the wide open container has no mechanism to control outflow, (2) there is no automatic switch to activate mixing during pouring, (3) the whisk is not of sufficient height to quickly mix the top portion when the chamber is filled with a viscous salad dressing, and (4) all surfaces in contact with food particles are not submersible for cleaning because the rotor is attached to the motor shaft of the base.

My invention overcomes the deficiencies of prior art by automatically initiating mixing upon pouring, mixing the entire contents to a uniform dispersion prior to the onset of outflow, having an outflow channel of sufficient diameter for the passage of solid spices, allowing adjustment of flow rate during dispensing, and having all parts that come in contact with food submersible for cleaning. With my invention, it is now possible to dispense representative samples of a wide variety of salad dressing in the quantity desired.

BRIEF SUMMARY OF THE INVENTION

In accordance with a preferred embodiment of the invention, there is disclosed a machine for dispensing samples representative of the original mixture at an adjustable flow rate comprising: a removable dispensing top with an outflow channel, an air vent, an air vent valve; a container housing a rotor; and a base housing an electric motor, batteries, a manual switch, and a switch that automatically actives mixing while pouring. My invention accommodates a wide variety of mixtures with different viscosities and different sized particles. All parts of the machine coming in contact with food are submersible in water for easy cleaning.

Objects and Advantages

The primary object of my invention is to provide a machine that dispenses samples of a mixture that are representative of the contents in the machine.

Another object of my invention is to provide for quick mixing of the entire contents of the machine to a uniform dispersion prior to dispensing.

Another object of my invention is to provide automatic mixing that is initiated by tilting to pour.

Another object of my invention is to provide a machine that will accommodate a wide variety of salad dressings that have different viscosities and particles of different sizes.

Another object of my invention provide an adjustable outflow rate that does not depend upon the angle of tilt or the diameter of the outflow channel.

Another object of the invention is to provide an accessible opening for refilling.

Another object of the invention is to provide an outflow channel that does not drip after pouring.

Another object of the invention is to provide airtight sealing of all openings for storage.

Still yet another object of the invention is to provide a machine for mixing and dispensing that can be cleansed of food particles by submersion in water.

A further object of the invention is to provide a machine for mixing and dispensing that will not break when cooled during refrigeration.

Other objects and advantages of the present invention will become apparent from the following descriptions, taken in connection with the accompanying drawings, wherein, by way of illustration and example, embodiments of the present invention are disclosed.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

Figure 1:
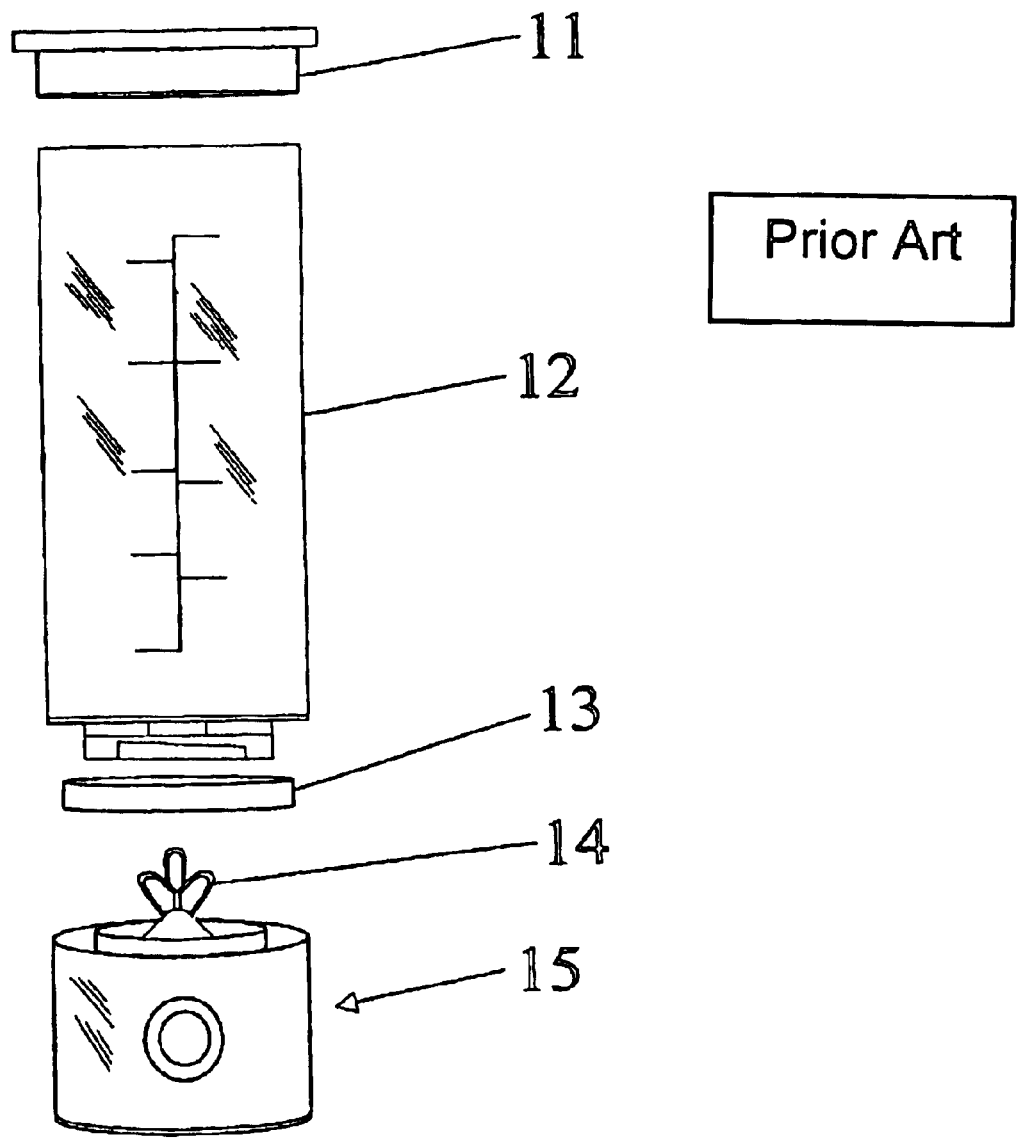
FIG. 1 shows prior art consisting of a perspective view of the Personal Power Mixer.

Reference Numerals In Drawings 11 lid
12 blending cup
13 rubber gasket
14 whipping whisk
15 water resistant base
17 spout
18 alignment dot
19 index mark for measuring
20 dispensing top
21 push-pull valve
22 outflow channel
23 groove for grasping
24 top o-ring
25 mixing chamber
26 manual switch
27 base of mixer/dispenser
28 push-pull valve o-ring
29 bottom of base
30a upper lip of spout
30b lower lip of spout
31 rotor
32 seal
33 coupler
34 upper bayonet mount
35 lower bayonet mount
36 motor support
37 air vent screw
38 air vent
39 motor shaft
40 tilt switch
41 front plate
42 rear plate 43 bottom of tilt switch
44 metal bar
45 contact point
46 contact plate
47 metal bolt
48 electrical connector
50 angle of tilt
51 vertical line
52 line of tilt
70 rectangular blade
71 rotor shaft
72 ring blade
73 pedestal of rotor
74 socket in rotor base
90 generic container
91 cup for solutions

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Description—FIG. 1—Prior Art

In FIG. 1 is illustrated prior art of the Personal Power Mixer, manufactured by Ontel Corporation, Fairfield, N.J. The mixer consists of sealing lid 11, blending cup 12, rubber gasket 13, whipping rotor 14, and water resistant base 15.

Description—FIGS. 2 through 9—Preferred Embodiment

Figure 2:
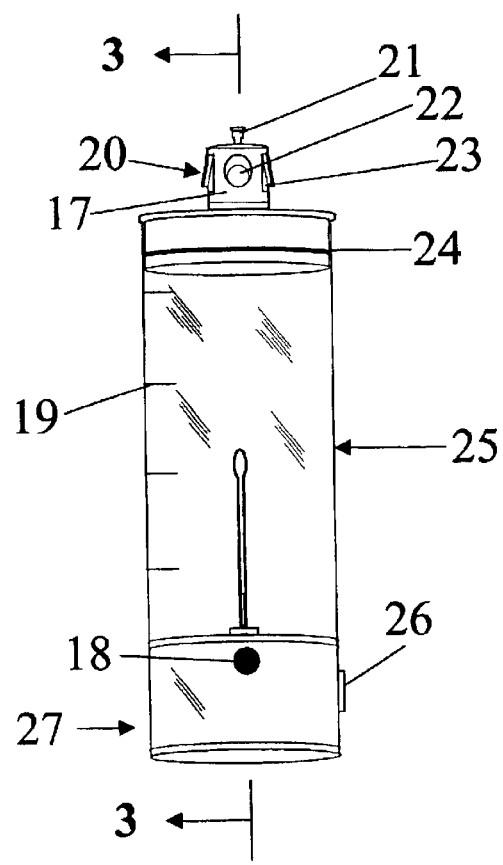
FIG. 2 is a perspective view of my mixer and dispenser.
Figure 3:
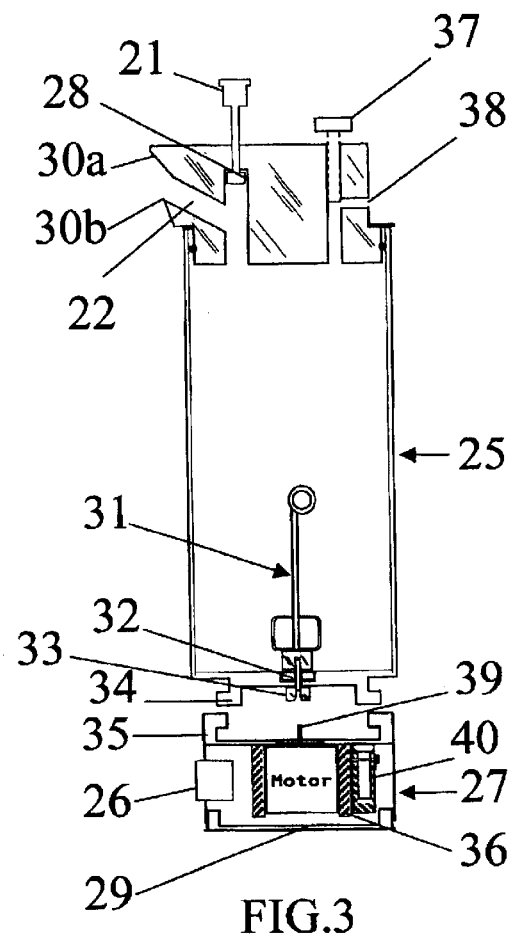
FIG. 3 is a cross-sectional view along axis 3—3 of FIG. 2 with the base rotated 90 degrees clockwise and showing the base separated from the mixing chamber.

As illustrated in FIGS. 2 and 3, top 20 includes the following elements: air vent screw 37, air vent 38, push-pull valve 21, push-pull valve o-ring 28, top o-ring 24, outflow channel 22, and gripping groove 23. In the preferred embodiment top 20 is held to chamber 25 by friction, however, top 20 could be attached to chamber 25 by another method, such as, a screw mechanism. In the preferred embodiment, rubber o-ring 24 makes the space between top 20 and chamber 25 leak proof. However, sealing the space between top 20 and chamber 25 can be by (1) another material, such as, a soft plastic in the same or in a different shape, or (2) the close apposition of top 20 to the inner wall of chamber 25. Alignment dot 18 on base 27 is for orienting top 20. As illustrated in FIGS. 2 and 3, channel 22 terminates in spout 17. Spout 17 consists of upper lip 30a and lower lip 30b. Lower lip 30b ends after upper lip 30a begins to taper outward. Air vent screw 37 changes the airflow through air vent 38 and adjusts the vacuum in chamber 25. Index mark 19 is one of a series for measuring the ingredients placed into mixing chamber 25.

FIG. 3 shows chamber 25 separates from base 27 between motor shaft 39 and coupler 33. Base 27 in FIG. 3 is rotated 90 degrees clockwise to chamber 25 for disassembly. Base 27 contains the motor, conventional storage batteries (not shown), manual switch 26, and tilt switch 40. Seal 32 and coupler 33 form a leak proof seal at the bottom of chamber 25. Rotor 31 rests on seal 32 and connects to coupler 33. In the preferred embodiment seal 32 is made of rubber, however, seal 32 can be constructed of another material, such as, a soft plastic. Coupler 33 connects rotor 31 to motor shaft 39. Chamber 25 is secured to base 27 by bayonet mounts 34 and 35 as illustrated in FIG. 3. Bottom plate 29 closes the motor compartment of base 27.

Figure 4A:
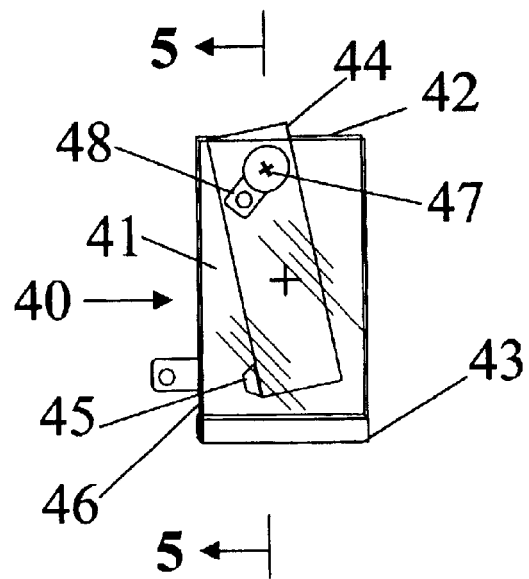
FIG. 4A is a perspective view of the tilt switch in the open position.
Figure 4B:
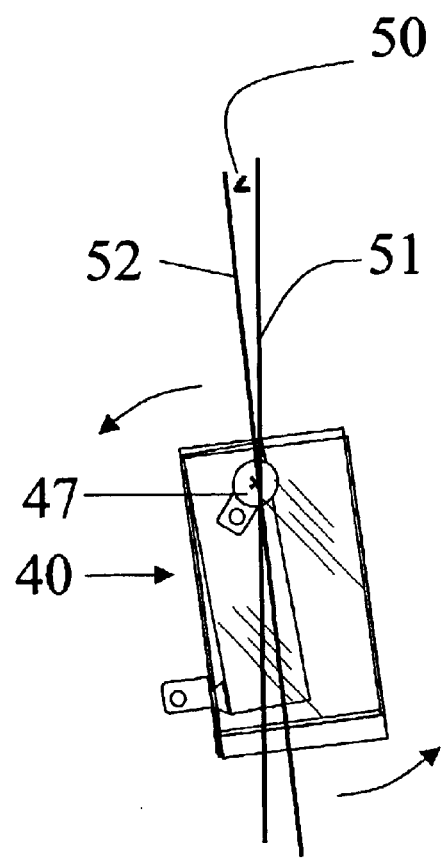
FIG. 4B is a perspective view of the tilt switch in the closed position.
Figure 5:
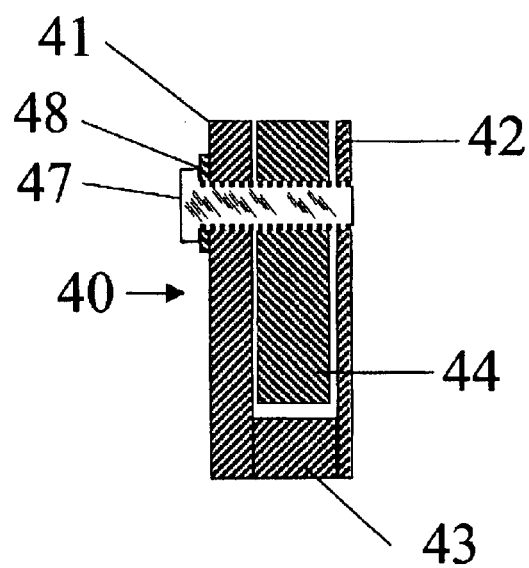
FIG. 5 is a cross-sectional view taken along line 5—5 of FIG. 4A showing details of the tilt switch.

My invention has two switches, manual switch 26 and tilt switch 40. Tilt switch 40 is attached parallel to motor support 36 as shown in FIG. 3. In FIG. 4A is shown tilt switch 40 which consists of nonconductive front support 41, nonconductive rear plate 42, bottom 43, electrical connector 48, contact plate 46, contact point 45, metal bar 44, and metal bolt 47. In FIG. 4B tilt switch 40 is tilted counter-clockwise. Line 51 is the vertical meridian, line 52 is parallel to the long axis of switch 40, line 51 and line 52 intersect through metal bolt 47, and angle of tilt 50 is the angle between line 51 and line 52. FIG. 5 is the cross-sectional view taken through axis 5—5 of FIG. 4A and shows bolt 47 threaded through the bolt hole in the front plate 41, metal bar 44, and rear plate 42. The threads of metal bolt 47 maintains metal bar 44 between front plate 41 and rear plate 42 and prevents metal bar 44 from touching front plate 41 or rear plate 42 while revolving.

Figure 6:
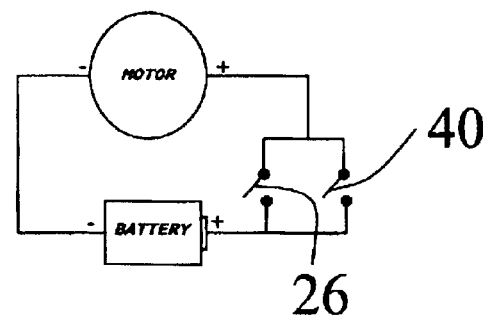
FIG. 6 is the circuit diagram.

The circuit diagram in FIG. 6 shows that either manual button 26 or tilt switch 40 will activate the motor.

Figure 7:
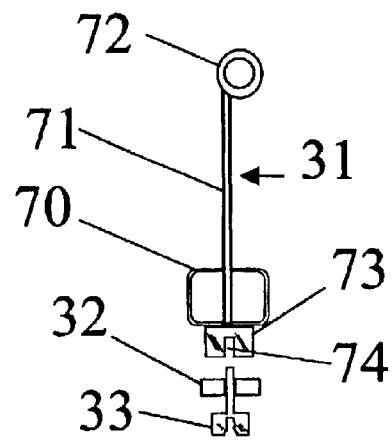
FIG. 7 is an enlarged cross-sectional view taken along line 3—3 of FIG. 2 showing the rotor, seal, and coupler.

FIG. 7 is a cross-sectional view taken through axis 3—3 of FIG. 2 showing an enlarged view of rotor 31, seal 32, and coupler 33. In the preferred embodiment rotor 31 is made of acetal resin, however, it can be made of other materials that are semi-flexible. Rotor 31 is configured with open rectangular blade 70 near pedestal 73 and thin shaft 71 supporting ring blade 72 that is off-centered. Socket 74 of pedestal 73 connects to the shaft of coupler 33. In the preferred embodiment, the shaft of coupler 33 is pressed into socket 74 of rotor 31; however, the shaft of coupler 33 could be connected to socket 74 by a screw mechanism. As illustrated in FIG. 3, seal 32 sets inside of a recess in the bottom of chamber 25 and fits around the shaft of coupler 33 to prevents the mixture from escaping from the bottom of mixing chamber 25.

Top 20, mixing chamber 25, and base 27 are constructed of plastic materials having a similar coefficient of expansion so that breakage will not occur when cooled during refrigeration.

Figure 8:
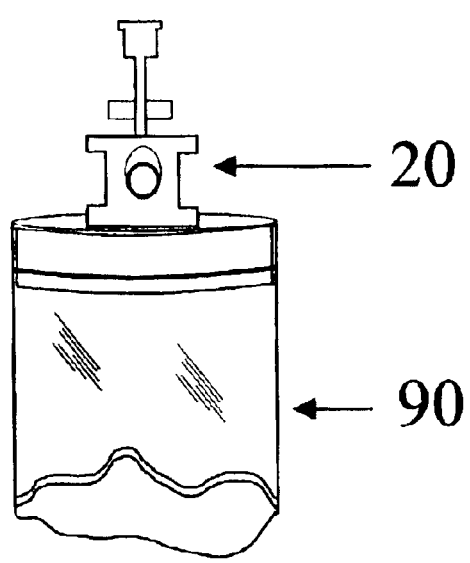
FIG. 8 is my dispensing top replacing the lid of a generic mixer.
Figure 9:
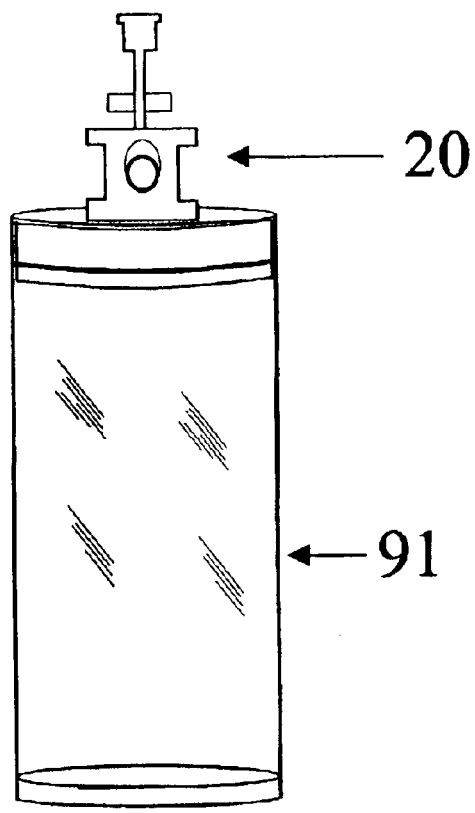
FIG. 9 is my dispensing top and a cup for holding solutions.

Description—FIGS. 8 and 9—Additional Embodiments

Top 20 can be used on a variety of containers to facilitate dispensing. One such example is generic container 90 as illustrated in FIG. 8. Container 90 could be prior art of FIG. 1 in which lid 11 is replaced with top 20. As illustrated in FIG. 9, another such container is cup 91 for holding solutions that do not require mixing.

Operation—FIGS. 2 thru 7

To fill my mixer and dispenser, top 20 is removed from chamber 25 by grasping chamber 25 and groove 23 of top 20 and pulling gently apart. The ingredients of the mixture are placed into chamber 25 and top 20 is replaced so that spout 17 aligns with the alignment dot 18 on base 27. If initial mixing is desired, manual switch 26 is engaged.

For dispensing, push-pull valve 21 is pulled out fully to open the outflow channel and the machine is tilted in the direction of the spout. As illustrated in FIG. 4B, counter-clockwise rotation (as indicated by arrows) of tilt switch 40 from the vertical position causes front plate 41, rear plate 42 and bottom 43 to rotate while metal bar 44 maintains the vertical position by revolving on metal bolt 47. Rotating the machine counter-clockwise about the long axis of bolt 47 activate mixing. The circuit closes when angle of rotation equals or exceeds angle of tilt 50, the angle between vertical line 51 and line of tilt 52, at which point contact point 45 contacts contact plate 46 and mixing begins.

The rectangular blades near the pedestal of rotor 31 stir the mixture in the lower part of chamber 25. Centrifugal force deviates the out of balance apex and causes flexible shaft 71 and ring blade 72 to spin in a conical path, which quickly stirs the upper portion of the mixture. Turning air vent screw 37 changes the effective size of lumen of air vent 38 and governs the vacuum that controls the outflow. When pouring begins, air vent screw 37 may be turned to adjust the rate of flow through outflow channel 22. Once the flow adjustment is made, further pours of that mixture require no additional adjustment. Returning the machine to the vertical position disengages contact point 45 from contact plate 46 of tilt switch 40 and the mixer shuts off.

At the conclusion of pouring, lower lip 30b catches the last drops and prevents the mixture from dripping down the face of the chamber 25. For storage, push-pull valve 21 is pressed down to close outflow channel 22 and air vent screw is advanced until air vent 38 is occluded.

For cleansing of the preferred embodiment, chamber 25 is removed from base 27 by twisting base 27 to unfastened bayonet mount 34 from bayonet mount 35. By interposing coupler 33 between motor shaft 39 and rotor 31, none of the mixture reaches base 27 and base 27 does not require cleansing with soap and water. The surfaces exposed to the mixture and require cleaning are confined to the upper unit and consist of top 20, chamber 25, rotor 31, seal 32, and coupler 33. The upper unit can be completely submersed for cleansing.

Advantages

From the description above, a number of advantages of my mixer and dispenser become evident:

a. My invention provides for the first time a mixer and dispenser that automatically mixes throughout the period of pouring and makes it possible to pour samples of different sizes containing ingredients in the same proportions as original mixture.

b. The adjustable flow rate is an improvement that provides smooth and even pouring of mixtures in the quantity desired.

c. The control of flow by vacuum and not by limiting the size of the outflow lumen makes it possible to dispense mixtures of different viscosities and containing solid matter of different sizes with the same machine.

d. Two switches in the circuit provide a manual switch for mixing while preparing the mixture and an automatic switch for constant mixing during pouring.

e. The outflow channel is configured to prevent dripping after pouring.

f. The grooved finger grip provides for secure grasping when removing the top.

g. The tall and out of balance rotor of my mixer and dispenser provides for the even and rapid distribution of kinetic energy to the lower and upper parts of the mixture.

h. All surfaces coming in contact with the mixture are submersible in water.

i. The easily operated push-pull valve closes the outflow channel for airtight storage of the mixture.

j. My invention will not break when cooled during refrigeration because the parts are constructed of plastics with a similar coefficient of expansion.

k. The top can be used on existing mixers to facilitate dispensing.

l. The top can be used for adjusting the flow from a cup for controlled dispensing of solutions that do not require mixing.

CONCLUSION, RAMIFICATIONS, AND SCOPE

Accordingly, the reader will see that my invention is an improvement over prior technologies, for the first time salad dressing can be dispensed in an even and controlled flow, in the quantity desired, and in samples that are representative of the original mixture. The dual switch circuit allows mixing during preparation and constant mixing during pouring. The constant and thorough mixing is essential to prevent layer separation during pouring and is a key feature in pouring a representative sample.

The adjustable air vent in conjunction with a large outflow channel gives excellent control of flow and allows the versatility of using one mixer and dispenser for a wide variety of salad dressings. Dripping after pouring is prevented because the lower portion of the outflow channel ends after the upper portion of the outflow channel begins to taper out. The push-pull closure valve is simpler to operate than flip-top, screw top and snap-on caps. Cleansing my invention of food debris is easy because all surfaces that come in contact with the mixture are submersible in water.

My invention can be used for a wide variety of salad dressings but the use is not limited to salad dressings. My invention is applicable for any mixture that has a liquid component. The dispensing top of my invention can be adapted to currently existing mixers and dispensers and impart the advantage of an adjustable rate of flow. My dispensing top can also be attached to a container without an associated mixer for dispensing solutions that do not require mixing.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A mixing and dispensing machine for mixing ingredients, comprising:
    a) a container;
    b) a rotor;
    c) said container being formed with an opening for emptying said container;
    d) a housing with a motor fastened to said container for rotating said rotor, and
    e) at least one automatically activated switch responsive to a change from a substantially vertical orientation of said container to an inclined orientation of said container for activating said motor and for mixing the ingredients when said container is in the inclined orientation immediately prior to dispensing.

2. A machine according to claim 1, which further comprises a removable top to said container providing a capability for emptying said container.

3. A machine according to claim 2, wherein said container, said top, and said base are constructed of substances having essentially equal coefficients of expansion.

4. A machine according to claim 2, wherein said top comprises a pouring spout with a variable flow rate controlled by position of a push-pull valve.

5. A machine according to claim 2, wherein said top comprises at least one vent valve for control of vacuum within said container during dispensing.

6. A machine according to claim 1, wherein said housing with said motor is removable from said container.

7. A machine according to claim 1, wherein at least one of said automatically activated switch is responsive to rotating in the direction of pouring.

8. A machine according to claim 1, wherein a manual switch activates said motor irrespective of container angle of rotation.

9. A machine according to claim 1, wherein a coupler connects said motor to said rotor such that said rotor remains within said container when said base separates from said container.

10. A machine according to claim 1, wherein said rotor has a pedestal, a flexible shaft with a weighted, out of balance apex mounted essentially parallel to an axis of rotation, and at least one blade.

11. A machine according to claim 1, wherein said container has index marks for measuring said ingredients.

12. A machine according to claim 1, wherein material dispensed and remaining in said container retain essentially equal proportions of said ingredients.

13. A machine according to claim 1, wherein said automatically activated switch comprises an electrical connector with a contact point connecting to a contact plate upon rotating said container through an angle larger than a specified angle of tilt, resulting in a closed electrical circuit causing electrical current flow to said motor.

14. A machine according to claim 1, wherein said automatically activated switch comprises an electrical connector with a contact point breaking connection with said contact plate upon rotation of said container below a specified angle of tilt, resulting in an open circuit causing interruption of electrical current flow to said motor.

15. A machine according to claim 1, wherein a power supply is operatively associated with said motor.

16. A machine according to claim 1, wherein a filling capability is provided for said container.

17. A machine according to claim 1, wherein said flexible shaft bends away from said axis of rotation in response to rotor spin, therein facilitating vortical fluid movement.

18. A machine according to claim 1, wherein said switch is configured to power said motor for mixing the ingredients during dispensing.

19. A mixing and dispensing machine for mixing ingredients, comprising:
   a) a container;
   b) a rotor;
   c) a capability for emptying said container;
   d) a housing with a motor, and at least one automatically activated switch responsive to angle of rotation for activating said motor when said container is tilted out of a substantially vertical orientation beyond an acceptable tilt angle; and
   e) a capability for coupling rotational energy from said motor to said rotor, wherein said machine mixes said ingredient immediately prior to dispensing when said container is in a substantially non-vertical orientation.

20. A machine according to claim 19, wherein said housing with said motor is removable from said container.

21. A machine according to claim 19, wherein material dispensed and remaining in said container retain essentially equal proportions of said ingredients.

22. A machine according to claim 19, wherein at least one of said automatically activated switch is responsive to rotating in the direction of pouring.

23. A machine according to claim 19, wherein a manual switch activates said motor irrespective of container angle of rotation.

24. A machine according to claim 19, wherein a coupler connects said motor to said rotor such that said rotor remains within said container when said housing separates from said container.

25. A machine according to claim 19, wherein said rotor has a pedestal, a flexible shaft with a weighted, out of balance apex mounted essentially parallel to an axis of rotation, and at least one blade.

26. A machine according to claim 19, wherein said container has index marks for measuring said ingredients.

27. A machine according to claim 19, wherein said container and said base are constructed of substances having an essentially equal coefficient of expansion.

28. A machine according to claim 19, wherein said automatically activated switch comprises an electrical connector with a contact point connecting to a contact plate upon rotating said container through an angle larger than a specified angle of tilt, resulting in a closed electrical circuit causing electrical current flow to said motor.

29. A machine according to claim 19, wherein said automatically activated switch comprises an electrical connector with a contact point breaking connection with said contact plate upon rotation of said container below a specified angle of tilt, resulting in an open circuit causing interruption of electrical current flow to said motor.

30. A machine according to claim 19, wherein a power supply is operatively associated with said motor.

31. A machine according to claim 19, wherein a filling capability is provided for said container.

32. A machine according to claim 19, wherein said flexible shaft bends away from said axis of rotation in response to rotor spin, therein facilitating vortical fluid movement.

* * * * *